United States Patent [19]
Higuchi et al.

[11] Patent Number: 5,583,582
[45] Date of Patent: Dec. 10, 1996

[54] VIDEO INTEGRAL-TYPE TELEVISION

[75] Inventors: Yoshio Higuchi; Kazuyuki Okada, both of Daito, Japan

[73] Assignee: Funai Electric Co., Ltd., Daito, Japan

[21] Appl. No.: 431,475

[22] Filed: May 1, 1995

Related U.S. Application Data

[63] Continuation of Ser. No. 887,292, May 22, 1992.

[30] Foreign Application Priority Data

Oct. 31, 1991 [JP] Japan ................... 3-313994

[51] Int. Cl.⁶ .................. A47B 5/00; H04N 5/64
[52] U.S. Cl. .......... 348/836; 348/843; 348/789; 312/7.2
[58] Field of Search ................ 211/26; 348/789, 348/808, 836, 843; 312/7.2; A47B 5/00; H04N 5/64

[56] References Cited

U.S. PATENT DOCUMENTS

| | | | |
|---|---|---|---|
| 3,572,865 | 3/1971 | Attardi | 312/7 |
| 4,716,493 | 12/1988 | Zelkowitz | 312/7.2 |
| 4,831,449 | 5/1989 | Kimura | 358/254 |
| 4,966,342 | 1/1991 | Noguera | 248/172 |
| 5,023,726 | 4/1991 | Campisi | 348/836 |
| 5,041,944 | 8/1991 | Campisi | 358/254 |
| 5,094,513 | 3/1992 | Fukuda | 312/7.2 |

FOREIGN PATENT DOCUMENTS 62193374  2/1988  Japan.

OTHER PUBLICATIONS

"AC/DC Television with Built-in VHS Video Cassette Player" J.C. Whitney & Co. Catalog N. 497 page D Jun. 1988.
"Full Function VCR and TV In One Space-Saving Package" Citicorp-Diners Club Sep. 21, 1987.

Primary Examiner—Kim Yen Vu
Assistant Examiner—Kimberly A. Williams
Attorney, Agent, or Firm—Lackenbach Siegel Marzullo Aronson & Greenspan, P.C.

[57] ABSTRACT

A mechanical deck guide and a board guide for video in which a video set and a print board for video are provided integrally with a front cabinet, and a board guide for television is disposed in an array with the board guide for video. A shield plate is provided on the mechanical deck guide so as to cover it.

16 Claims, 5 Drawing Sheets

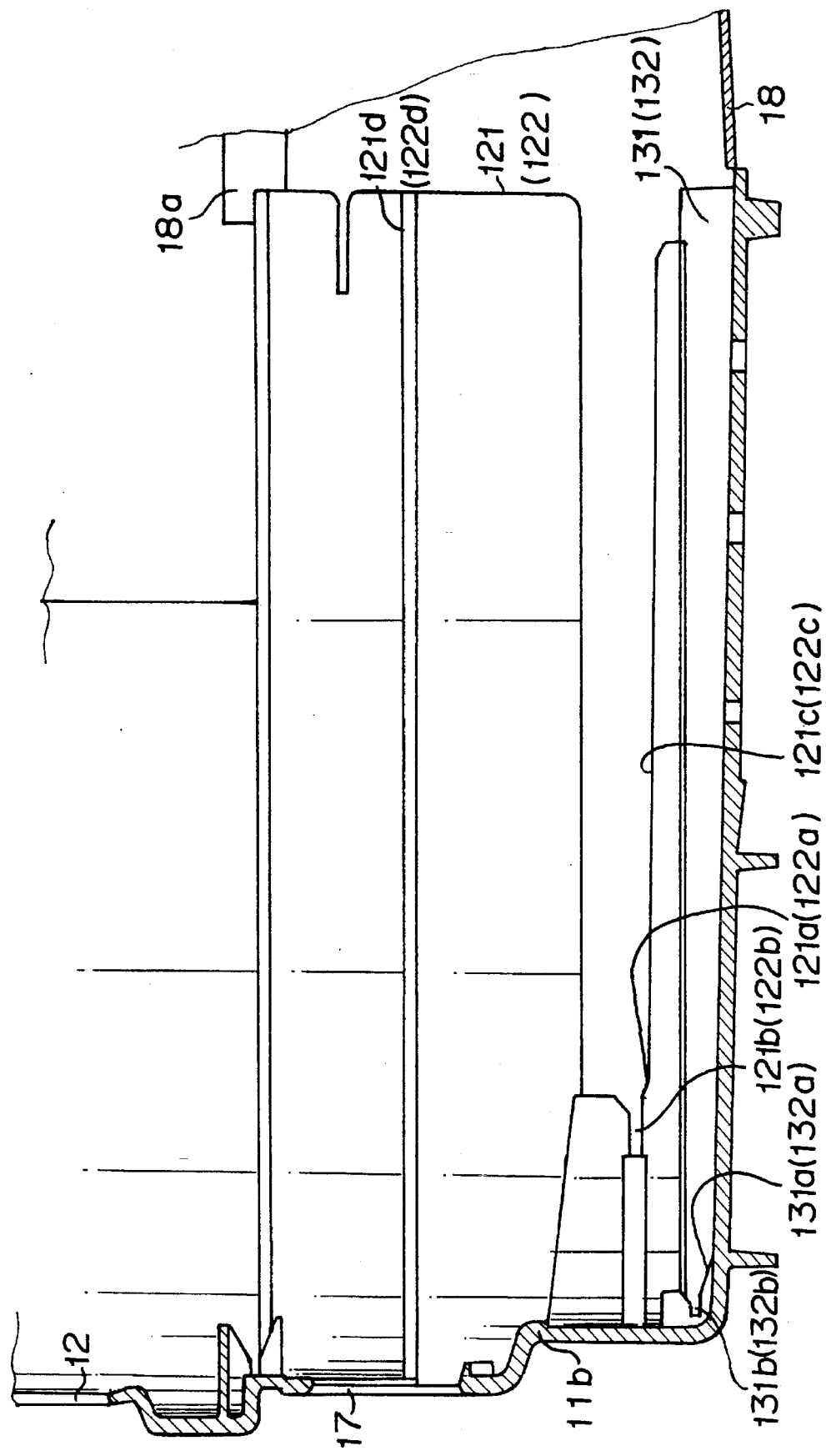

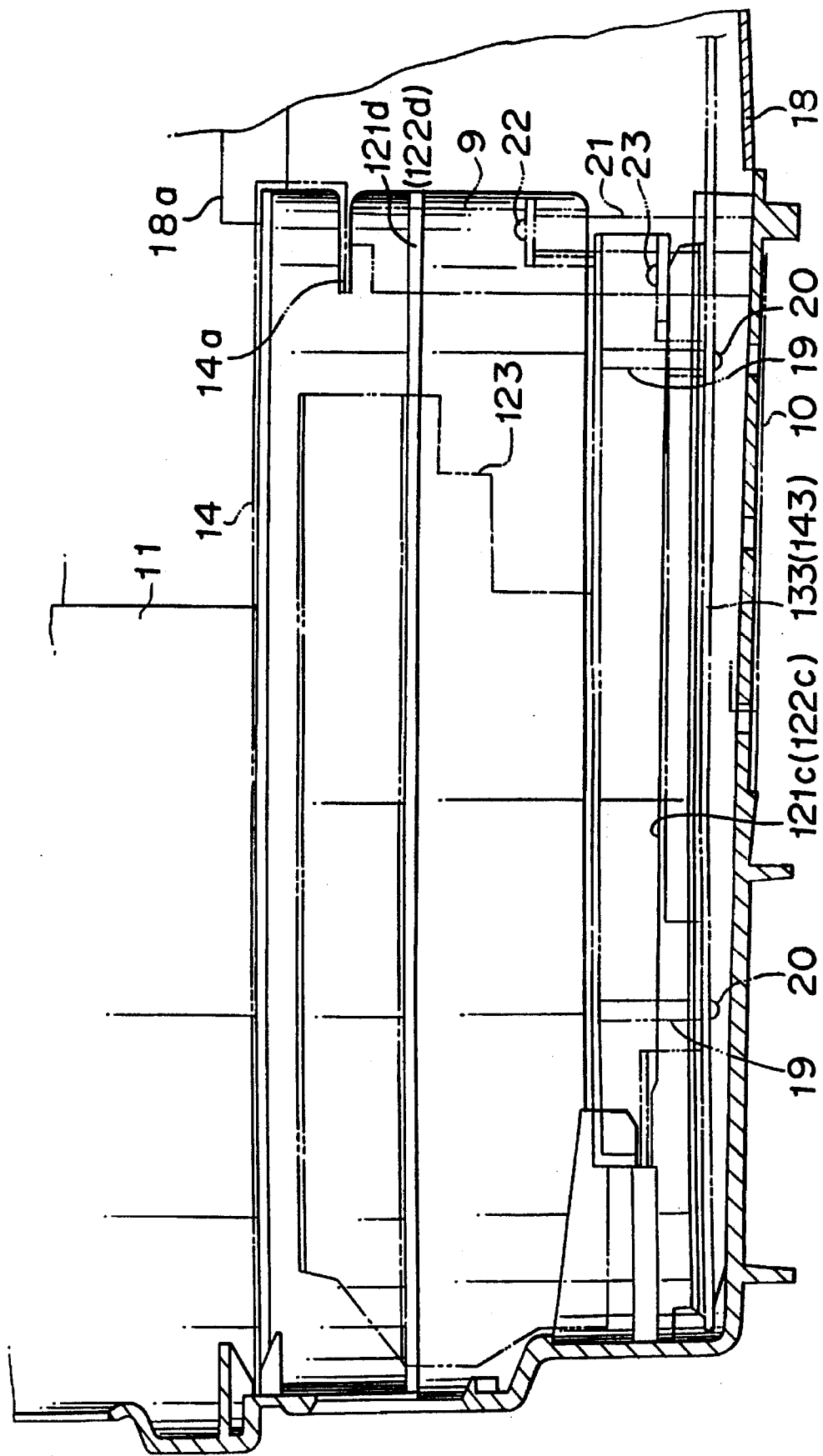

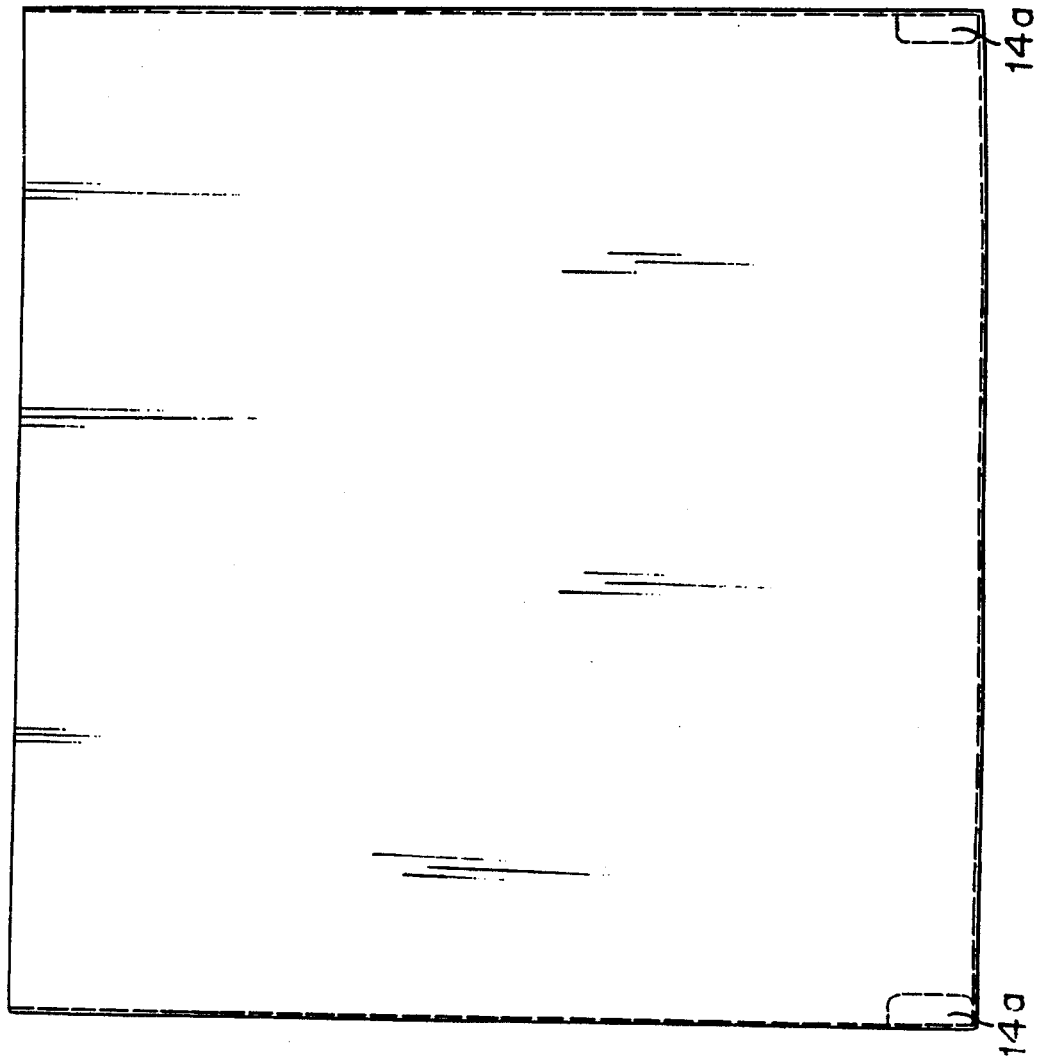

VIDEO INTEGRAL-TYPE TELEVISION

This application is a continuation, of application Ser. No. 07/887,292, filed May 22, 1992.

BACKGROUND OF THE INVENTION

This invention relates to a video integral-type television (hereinafter called "TV-video") which contains a television set and a video recorder or player in a cabinet.

In a conventional TV-video, as shown in FIG. 7 (back view of TV-video) and in FIG. 8 (transverse sectional view thereof), the video recorder or player 1 is placed on a bottom plate 2a in a cabinet 2, the front surface is secured with a screw 3 in front of a front plate 2b of the cabinet 2. Further, the rear portion thereof is secured with screws 3 to a rear cabinet 8 as shown in FIG. 8.

A mechanical deck 1a of the video recorder or player 1 is attached to a plastic molded casing 1b. As shown in FIG. 8, the rear portion of the mechanical deck 1a or the rear portion of the casing 1b is provided with a plurality of television printed circuit boards 5 in a vertical direction.

A television printed circuit board of the television set is attached along the inner inside of one side in the cabinet 2, said printed circuit board 5 being provided with a power transformer for television 6. As the power transformer for television, a flyback transformer is chiefly used. Further, as the one for the video, a power source not illustrated in the video recorder or player 1 is separately provided.

In FIG. 7, numeral 7 is a shield plate provided on the video recorder or player.

As described above, in the conventional TV-video, a video deck cuts into the cabinet of the television set and is attached to the cabinet as it is.

Accordingly, the wiring lines between the television printed circuit board 5 and the printed circuit board for video printed circuit board 4 are long and numerous as shown in FIG. 7 and FIG. 8.

In addition, it takes considerable time to install the television printed circuit board 5 and the video printed circuit board 4 . . . 4.

Heretofore, since the video deck is designed to be contained in the cabinet as it is, the power source for video is provided to the video deck, while the power source for television is provided to the television set, respectively. Accordingly, the number of parts is numerous and there exist defects, such as the video set catching noise through the power for television.

BRIEF DESCRIPTION OF THE INVENTION

This invention is characterized in that in a TV-video recorder or player, wherein a television set and a video recorder or player are contained in the same case:

a front end thereof is fixed to the inside of a front plate of the front cabinet and arranged approximately parallel to a case bottom plate; comprises a mechanical deck guide wherein a mechanical deck of the video recorder or player is inserted slidably therein from the rear of the case, a board guide for video arranged at a lower portion of the mechanical deck guide and a printed circuit board for video is inserted therein from the rear portion of the case providing a fixed slit to the bottom plate of the front cabinet, a board guide for television arranged parallel to the board guide for said video, and a shield plate placed on said mechanical deck guide removably so as to cover said mechanical deck guide; said mechanical deck guide, said board guide and said board guide for television being inserted the mechanical deck of the video recorder or player, the video printed circuit board and the television print board respectively from the rear of the front cabinet.

Further, said mechanical deck guide, said board guide for video and said board guide for television are integrally formed with the cabinet, respectively.

At a base end of the cabinet front plate side of said mechanical deck guide, the board guide plate for video and board guide for television are provided with a taper-like guide portion and an engaged supporting portion, respectively.

The video printed circuit board is screwed to the lower surface of the mechanical deck through a supporter, while the rear end of the mechanical deck is attached to the bottom plate of the front cabinet removably.

A connecting line which connects the video printed circuit board to the television printed circuit board is removably connected to each other.

The television printed circuit board is provided with the common power for the television and video recorder or player.

The above common power is a switching power.

Since the video printed circuit board is attached under the mechanical deck of the video recorder or player, both the mechanical deck and the video printed circuit board are inserted in the board guide for the video and the mechanical deck at the same time.

The connection of the video printed circuit board to the television print board is performed by connecting the connector.

The top ends of the mechanical deck, printed circuit board video and television printed circuit board are inserted along the guide forwardly, and guided to the engaged supporting portion through the taper-like guiding portion to be grasped at each top end firmly by the engaged supporting portion.

Since the power source is common and attached to the printed circuit board for television, the negative influence of magnetic force to the video recorder or player is avoidable.

BRIEF DESCRIPTION OF THE DRAWINGS

FIG. 2 is a vertical sectional view which shows the state of the front cabinet seen from the side.

FIG. 3 is a vertical sectional view which shows the state wherein the mechanical deck and the printed circuit board for video are contained in the front cabinet.

FIG. 4 is a right side view of the shield plate of this invention. FIG. 5 is a plane view of the shield plate of this invention. FIG. 6 is a side view of the shield plate of this invention.

DETAILED DESCRIPTION OF THE INVENTION

Detailed description of this invention will be explained as follows based upon the attached drawings.

Figure 1:
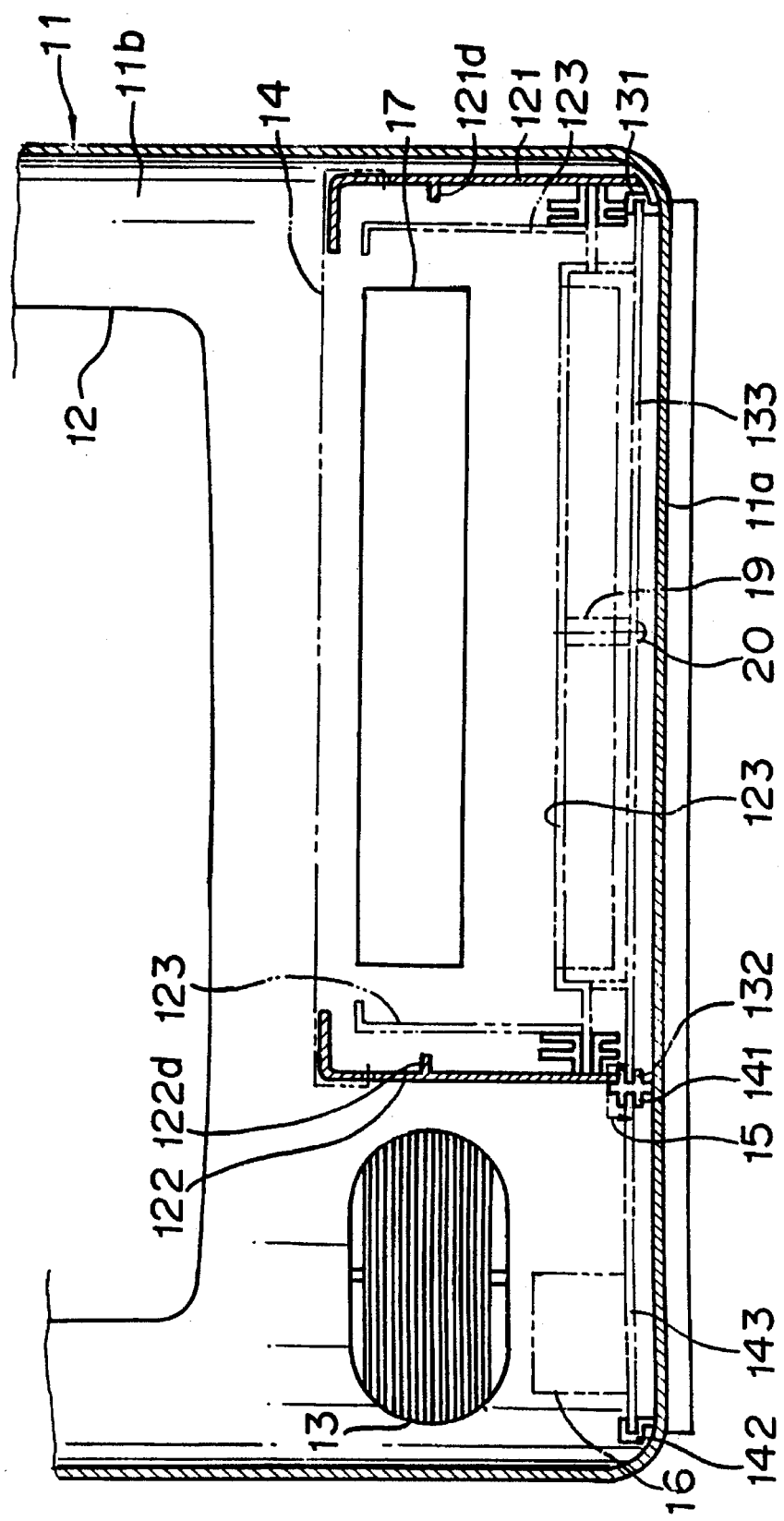
FIG. 1 is a transverse sectional view which shows the state of the front cabinet as seen from the rear.
Figure 7:
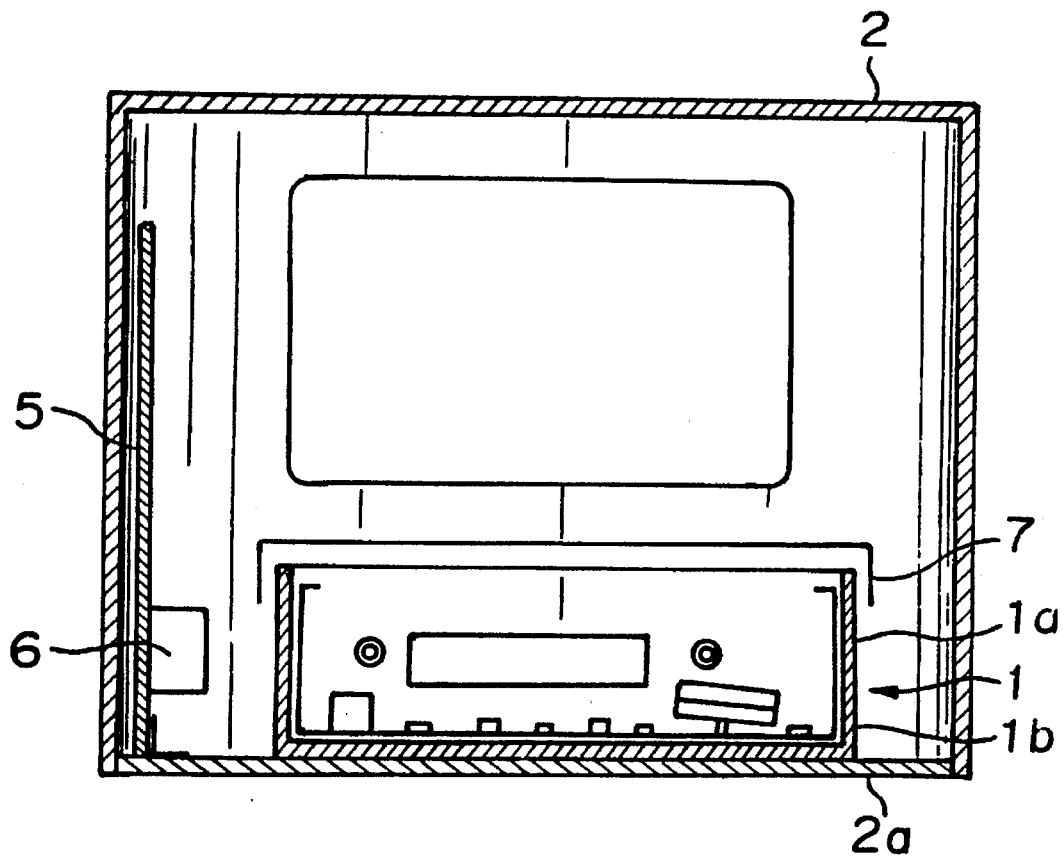
FIG. 7 is a rear view of the conventional video integral-type television and FIG. 8 is a transverse sectional view of the conventional video integral-type television.
Figure 8:
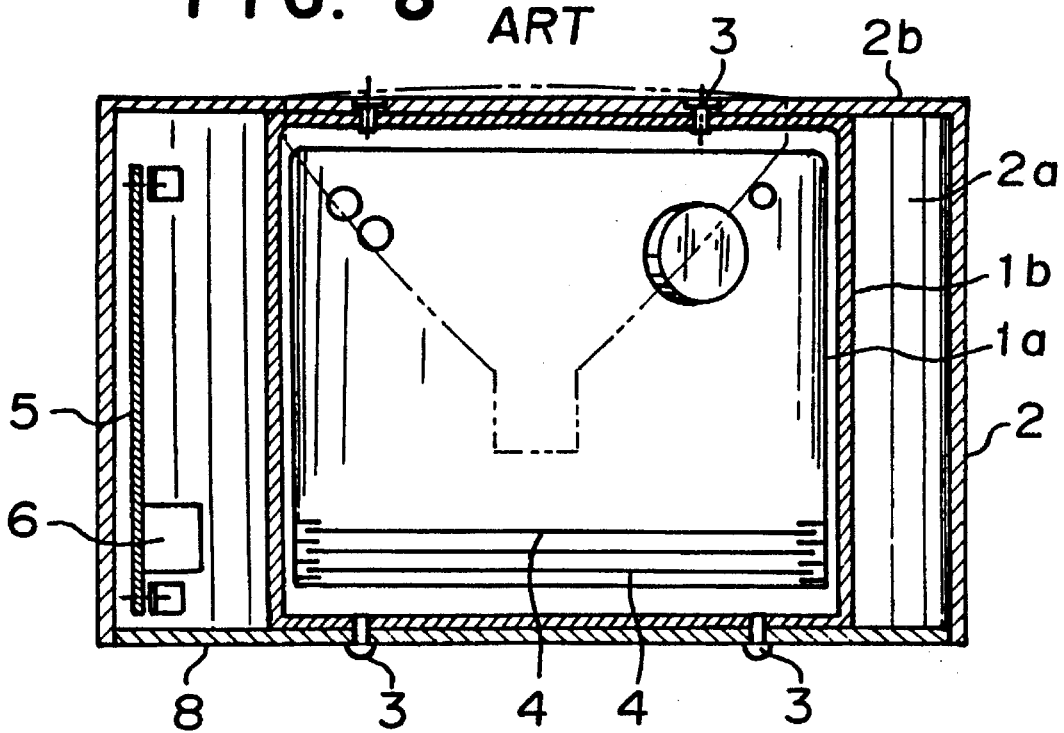

FIG. 1 is a transverse sectional view which shows a state of the front cabinet of this invention as seen from the rear. FIG. 2 is a vertical sectional view which shows a state of the front cabinet of this invention as seen from the side. FIG. 3 is a vertical sectional view which shows a state wherein the mechanical deck and the video printed circuit board are contained in the front cabinet of FIG. 2. FIG. 4 is a right side view of the shield plate. FIG. 5 is a plane view of the shield plate and FIG. 6 is a side view of the shield plate.

In the Figures, numeral 11 is a front cabinet, 12 is a window for a Braun tube, 13 is a window for a speaker, 121 and 122 are mechanical deck guides, 131 and 132 are board guides for video, and 141 and 142 are board guides for television.

The mechanical deck guides 121 and 122 are formed integrally with the front plate 11b of the front cabinet 11 and arranged parallel to the bottom mechanical guide.

However, the mechanical deck guides 121 and 122 may be fixed to the front plate of the front cabinet 11.

Further, at the lower portion of the mechanical deck guides 121 and 122, the board end of the board guides for video 131 and 132 are integrally formed or fixed thereto the same as the mechanical deck guides 121 and 122 at a fixed slit with the bottom plate 11a of the front cabinet.

Furthermore, the board guides for television 141 and 142 are arranged parallel to the board guides for video 131 and 132 by the same construction as the board guides for video 131 and 132.

In order to wrap the top end of the mechanical deck 123 (shown by two points chain line) in the mechanical deck guides 121 and 122, taper-like guide portions 121a and 122a and engaged supporting portions 121b and 122b are provided respectively at the board end of the front plate 11b in the mechanical deck guides 121 and 122. The numerals 121c and 122c are guides at the time of inserting the mechanical deck 123 (shown by two points chain lines) and the mechanical deck 123 is introduced along those guides to attain to the guide portions 121a and 122a.

The introducing portions 131a, 132a and the engaged supporting portions 131b, 132b are also provided at the front plate 11b sides of the board guides for video 131 and 132. In addition, at the front plate sides of the board guides for television 141 and 142 are also provided with the introducing portions and the engaged supporting portions, which are not illustrated.

The numeral 15 is a connector which connects the printed circuit board for video 133 (two points chain line) and the printed circuit board for television (two points chain line) and are removable from each other.

In the Figures, the numeral 16 is a switching power.

The numerals 121d and 122d are upper portion guides provided at the intermediate portion between the mechanical deck guides 121 and 122, said upper portion guide being parallel to the bottom plate 11a and being a rib which reinforces the mechanical deck guide.

The numeral 17 is an inserting hole of the video hole.

The numeral 14 is a shield plate wherein tabs for engagement 14a, FIG. 3 are provided by being hooked at the rear end as shown in the Figures.

Assembling of the mechanical deck 123, printed circuit board for video 133, printed circuit board for television 143, shield plate 14 or the like to the front cabinet 11 will be explained as follows.

The printed circuit board for video 133 is clamped with screws 20 at the lower portion of the mechanical deck 123 through the supporter 19. This printed circuit board 133 is inserted from the rear of the front cabinet 11 along the guides 121c, 122c as shown in FIG. 2 and at last when urged strongly, the top end of the mechanical deck 123 and the printed circuit board for video 133 are respectively engaged with the engaged supporting portion to wrap through the above introducing portion.

The shield plate 14 is also inserted into the front cabinet 11 from the rear thereof, and tabs for engagement 14a, 14a of the rear end constrain the rear end of the shield plate 14 with rib 18a of the rear cabinet 18 in a state that the tabs 14a, 14a are inserted into the rear end of the mechanical guides 121 and 122, thereby preventing the drawing out of the shield plate 14 to the outside.

If an earth of the shield plate 14 is necessary, the shield plate 14, mechanical deck 123 and the bottom cover 10 can be electrically connected by providing an earth plate 9 and clamping with a bolt 23.

Then, the television printed circuit board 143 is inserted in the board guides for television 141 and 142 to be engaged to the engaged supporting portion through the introducing portion (not illustrated), the top end thereof the same as the print substrate for video.

The wiring of the video printed circuit board 133 and of the television printed circuit board 143 are connected to each other by inserting the connector 15.

The rear end of the mechanical deck 123 is fixed to the bottom plate 11a with bolts 22 and 23 through a spacer 21 as shown in FIG. 3.

According to this invention described in detail, the following effects are obtained:

(1) Heretofore, since the video deck is contained within the cabinet, a casing (the greater part of the casing is prepared by plastic mold forming) for containing the mechanical deck is necessary, while in this invention there is no necessity for the casing because the mechanical deck is maintained by guide, and it is lightweight.

(2) The printed circuit board for video is inserted in the guide in a state that it is fixed to the lower portion of the mechanical deck. Since the television printed circuit board is also assembled after being inserted to the guide, assembling is easy.

(3) Since the printed circuit boards for both video and television are disposed in an array and connected with the connector, there is no need of wiring between the video and television sets.

(4) Since the power source for video does not exist on the printed circuit board of the video recorder or player, but is provided on the printed circuit board for television as a common power source, there is no negative influence due to the magnetic line of force of the power source. Further, since the power source is common, the number of parts is few.

What we claim is:

1. A generally light weight TV-VCR compound assembly comprising:

a television set;

a video cassette recorder;

a common power source for said television set and said video cassette recorder having no negative influence due to magnetic lines of force of said power source;

a single cabinet for receiving said television set and said video cassette recorder, said cabinet formed by front, rear, top and bottom parts, as well as side walls, each said front, rear, top and bottom parts and said side walls having interior and exterior surfaces, said bottom part having a slit;

a mechanical deck guide having at least a front end and a lower portion, said front end connected to the interior surface of said front part of said cabinet, said mechanical deck guide being substantially parallel to said bottom part of said cabinet;

a mechanical deck for said video cassette recorder, said mechanical deck supported by said mechanical deck guide and insertable into said cabinet from a side of said rear part thereof;

a printed circuit board including electrical circuitry for said video cassette recorder, said printed circuit board positioned at said lower portion of said mechanical deck guide in the vicinity of said slit, said printed circuit board being insertable from said side of said rear part;

a board guide for said video cassette recorder, said board guide positioned at said lower portion of said mechanical deck guide near said slit, said board guide being insertable into said cabinet from a side of said rear part of said cabinet;

a board guide for said television set situated within said cabinet near said board guide for said video cassette recorder;

a shield covering said mechanical deck guide; and a printed circuit board including electrical circuitry for said television set comprising said common power source; said printed circuit boards being in edge-to-edge juxtaposed relationship and in a plane with a mechanical connector bridging said printed circuit boards, so as to enable a connection from said common power source to each of said printed circuit boards;

whereby parts are minimized and assembly easy; and said mechanical deck for said video cassette recorder, said printed circuit board for said video cassette recorder and said printed circuit board for said television set being inserted into said rear part of said cabinet respectively by way of said mechanical deck guide, said board guide for said video cassette recorder and said board guide for said television set; and whereby said printed circuit boards for both said video cassette recorder and said television set are disposed in an array and connected with said mechanical connector so as to intergrate functionally said common power source and eliminate any need for wiring between said television set and said video cassette recorder.

2. A TV-VCR compound assembly according to claim 1, wherein said mechanical deck, said board guide for the video cassette recorder and the board guide for the television set are formed integrally with said cabinet.

3. A TV-VCR compound assembly according to claim 2, wherein said front end of said mechanical deck guide, said board guide for the video cassette recorder and said board guide for said television set are each provided with a guide portion and engaged supporting portion.

4. A TV-VCR compound assembly according to claim 3, wherein said printed circuit board for the video cassette recorder is fastened to the lower surface of said mechanical deck through a supporter and the rear end of said mechanical deck.

5. A TV-VCR compound assembly according to claim 4, wherein said printed circuit board for the video cassette recorder is connected to the bottom part of said cabinet.

6. A TV-VCR compound assembly according to claim 5, wherein said printed circuit board for said video cassette recorder and said printed circuit board for the television set are electronically connected respectively with said video cassette recorder and said television set.

7. A TV-VCR compound assembly according to claim 1, wherein said board guide for the video cassette recorder has at least two guide members and said board guide for said television set includes at least two guide elements and a guide assembly is provided formed integrally with one said guide member and one said guide element.

8. A TV-VCR compound assembly according to claim 1, wherein said common power source is on a side of said cabinet where said printed circuit board for said television set is located.

9. A TV-VCR compound assembly according to claim 1, wherein said common power source is on a side of said cabinet where said printed circuit board for said video cassette recorder is located.

10. A generally light weight TV-VCR compound assembly comprising:

a television set;

a video cassette player;

a common power source for said television set and said video cassette player having no negative influence due to magnetic lines of force of said power source;

a single cabinet for receiving said television set and said video cassette player, said cabinet formed by front, rear, top and bottom parts, as well as side walls, each said front rear, top and bottom parts and said side walls having interior and exterior surfaces, said bottom part having a slit;

a mechanical deck guide having at least a front end and a lower portion, said front end connected to the interior surfaces of said front part of said cabinet, said mechanical deck guide being substantially parallel to said bottom part of said cabinet;

a mechanical deck for said video cassette player, said mechanical deck being supported by said mechanical deck guide and insertable into said cabinet from a side of said rear part thereof;

a printed circuit board including circuitry for said video cassette player, said printed circuit board positioned and said lower portion of said mechanical deck guide in the vicinity of said slit, said printed circuit board being insertable from said side of said rear part;

a board guide for said video cassette player, said board guide positioned at said lower portion of said mechanical deck guide near said slit, said board guide being insertable into said cabinet from said side of a rear part of said cabinet;

a board guide for said television set situated within said cabinet near said board guide for said video cassette player;

a shield covering said mechanical deck guide; and a printed circuit board including circuitry for said television set comprising said common power source; said printed circuit boards being in edge-to-edge juxtaposed relationship and in a plane with a mechanical connector bridging said printed circuit boards, so as to enable a connection from said common power source to each of said printed circuit boards; whereby parts are minimized and assembly easy; and said mechanical deck for said video cassette player, said printed circuit board for said video cassette player and said printed circuit board for said television set being inserted into said rear part of said cabinet respectively by way of said mechanical deck guide, said board guide for said video cassette player and said board guide for said television set; and whereby said printed circuit boards for both said video cassette player and said television set are disposed in an array and connected with said mechanical connector so as to integrate functionally said common power source and eliminate any need for wiring between said televison set and said video cassette player.

11. A TV-VCR compound assembly according to claim 10, wherein said mechanical deck, said board guide for the video cassette player and the board guide for the television set are formed integrally with said cabinet.

12. A TV-VCR compound assembly according to claim 11, wherein said front end of said mechanical deck guide, said board guide for the video cassette player and said board guide for said television set are each provided with a guide portion and engaged supporting portion.

13. A TV-VCR compound assembly according to claim 12, wherein said printed circuit board for the video cassette player is fastened to the lower surface of said mechanical deck through a supporter and the rear end of the mechanical deck.

14. A TV-VCR compound assembly according to claim 13, wherein said printed circuit circuit board for the video cassette player is connected to the bottom part of the cabinet.

15. A TV-VCR compound assembly according to claim 14, wherein said printed circuit board for said video cassette player and said printed circuit board for the television set are electronically connected respectively with said video cassette player and said television set.

16. A TV-VCR compound assembly according to claim 10, wherein said board guide for the video cassette player has at least two guide members and said board guide for said television set includes at least two guide elements and a guide assembly is provided formed integrally with one said guide member and one said guide element.

* * * * *